United States Patent [19]
Lammert et al.

[11] 3,919,209
[45] Nov. 11, 1975

[54] 2,3-METHYLENECEPHAM ANTIBIOTICS
[75] Inventors: Steven R. Lammert, Greenwood; Stjepan Kukolja, Indianapolis, both of Ind.
[73] Assignee: Eli Lilly and Company, Indianapolis, Ind.
[22] Filed: Jan. 16, 1974
[21] Appl. No.: 433,966

[52] U.S. Cl. ............................ 260/243 C; 424/246
[51] Int. Cl.² ...................................... C07D 501/20
[58] Field of Search ............................... 260/243 C

[56] References Cited
UNITED STATES PATENTS
3,769,277   10/1973   Long et al. ...................... 260/243 C

*Primary Examiner*—Nicholas S. Rizzo
*Attorney, Agent, or Firm*—Steven R. Lammert; Everet F. Smith

[57] ABSTRACT

7-Phthalimido-3-methyl-2,3-methylenecepham-4-carboxylic acid ester sulfoxides are prepared via the reaction of penicillin sulfoxide ester derived 3-methyl-2-(2-chlorosulfinyl-4-oxo-3-phthalimido-1-azetidinyl)-3-butenoate esters with diazomethane and converted to biologically active 7-acylamino-3-methyl-2,3-methylenecepham-4-carboxylic acids.

18 Claims, No Drawings

2,3-METHYLENECEPHAM ANTIBIOTICS

BACKGROUND OF THE INVENTION

Penicillins and, more recently, cephalosporins have been recognized for their high degree of antibacterial activity and have been used extensively for the treatment of infectious diseases in man. There has been a considerable research effort directed toward the chemical modification of substituents on these compounds in search of yet more active beta-lactam antibiotics. Much emphasis has been placed specifically on the variation of the 6-acylamino substituent on the penicillin compounds and both the 7-acylamino and 3-(substituted)methyl functionalities on the cephalosporin compounds. However, in light of many recent advances in synthetic organic chemistry, other novel variations in the structure of these compounds have been made feasible. For example, novel 6-substituted penicillins and 7-substituted cephalosporins have been reported [See, e.g., W. A. Spitzer and T. Goodson Tet. Let., No. 4, pp. 273–276 (1973) or Lovja D. Cama and B. G. Christensen, Tet. Let., No. 36, pp. 3505–3508 (1973)].

Furthermore, new bicyclic azetidinone compounds not incorporating the thiazolidine or dihydrothiazine functionalities of the penicillin or cephalosporin ring systems have been prepared [See, e.g., S. Kukolja, J. Amer. Chem. Soc., 94, 7590 (1972); J. C. Sheehan and M. Dadic, J. Heterocyclic Chem., 5, 779 (1968); S. Wolfe et al., Cand. J. Chem., 50, 2907 (1972); H. Scartazzini et. al., Helv. Chim. Acta., 55, 2567 (1972); and D.O. Spry, Chem. Comm., 671 (1973)].

This invention relates to biologically active 7-acylamino-3-methyl-2,3-methylenecepham-4-carboxylic acids, pharmaceutically acceptable salts thereof, and a process for the preparation of their immediate precursor 7-imido-3-methyl-2,3-methylenecepham-4-carboxylic acid ester S-oxides.

SUMMARY OF THE INVENTION

This invention is directed toward compounds of the formula:

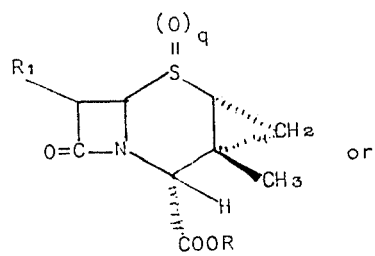

or

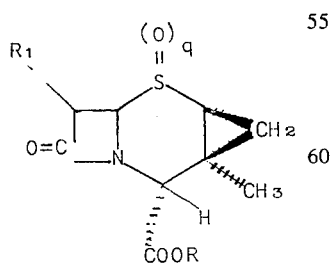

wherein $R_1$ is amino, acylamino, or imido; R is hydrogen, an alkali metal cation, or a carboxy protecting group, and $q$ is 1 or 0 indicating the sulfoxide or sulfide oxidation state of the sulfur atom in the tricyclic compound.

Furthermore, this invention is directed to a process for the preparation of compounds of the above formulae wherein $R_1$ is an imido group and $q$ is 1, which comprises reacting a sulfinyl chloride of the formula

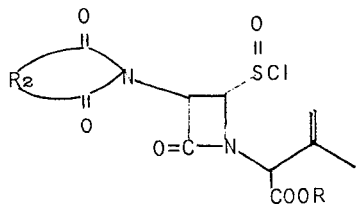

with at least 2 equivalents of diazomethane in an inert organic solvent at a temperature between $-10°$ and $40°C.$, wherein in the above formula, $R_2$ is the residue of an imide derived from a dicarboxylic acid and R is as defined above. Compounds wherein $R_1$ is amino are, in general, prepared from those compounds of the above formulae wherein $R_1$ is imido by a series of reactions comprising (a) basic hydrolysis (NaOH or $Na_2S$) of the imido group to the corresponding "amic" acid; (b) conversion of the "amic" acid to the corresponding isoimide via a dehydrating or condensing agent such as dicyclohexylcarbondiimide; and (c) treatment of the resulting isoimide with a hydrazine compound to give the respective amino derivative. Subsequent acylation of the amino derivatives provides the 7-acylamino-3-methyl-2,3-methylenecepham compounds which inhibit the growth of pathogenic organisms.

DETAILED DESCRIPTION OF THE INVENTION

The tricyclic 2,3-methylenecepham compounds provided by this invention are represented by the following formulae I and II

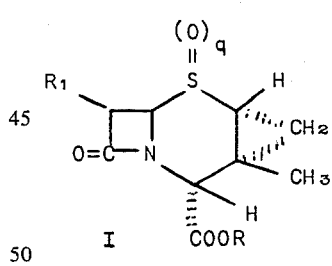

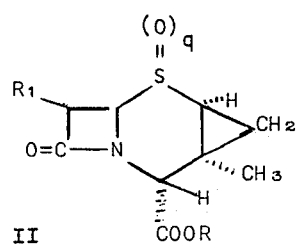

wherein R is hydrogen, an alkaline earth or alkali metal cation, or a carboxylic acid protecting group; $R_1$ is amino, $C_1$–$C_7$ alkanamido, benzamido, 2-carboxybenzamido, phthalisoimido or a group represented by the formula

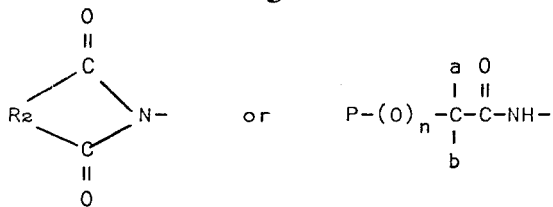

wherein
R₂ is the residue of an imide derived from a dicarboxylic acid;
P is 2-thienyl, 3-thienyl, 2-furyl, 3-furyl, phenyl, or substituted phenyl wherein the substituent is $C_1$–$C_3$ alkoxy, hydroxy, nitro, fluoro, chloro, bromo, iodo, or trifluoromethyl;
$n$ is 0 or 1
$a$ is hydrogen or $C_1$–$C_3$ alkyl;
$b$ is hydrogen, $C_1$–$C_3$ alkyl, hydroxy, protected hydroxy, amino, protected amino, carboxy or protected carboxy; with the limitation that when $n$ is 1, P is phenyl or substituted phenyl, and $b$ is hydrogen or $C_1$–$C_3$ alkyl; and $q$ is 0 or 1.

In the foregoing definition of the compounds provided by the present invention the term "$C_1$–$C_7$ alkanamido" refers to formyl, acetamido, propionamido, butyramido, iso-butyramido, pivalamido, valeramido, n-hexanamido, n-heptanamido, and like groups. The term "$C_1$–$C_3$ alkyl" has reference to methyl, ethyl, n-propyl, and iso-propyl. The term "$C_1$–$C_3$ alkoxy" as defined herein refers to methoxy, ethoxy, iso-propoxy and n-propoxy.

The term "a residue of an imide derived from a dicarboxylic acid" refers to groups such as $C_2$–$C_4$ alkylene, 1,2-phenylene or 1,2-cyclohexenylene. Examples of imido groups from which said radical residue would be derived include phthalimido, maleimido, 3,4,5,6-tetrahydrophthalimido, 3,6-dihydrophthalimido and like imido groups. The exact nature of the imido group is not important since the primary purpose for incorporating the nitrogen atom into an imido ring system of this type is to render said nitrogen atom chemically inert to the reaction conditions necessary for carrying out the process of this invention.

The sulfoxide or the sulfide oxidation state of the sulfur atom in the compounds illustrated by Formulae I and II is indicated by $q$ being 1 or 0 respectively.

The term "protected amino" refers to an amino group substituted by one of the commonly employed amino blocking groups such as t-butoxycarbonyl, benzyloxycarbonyl, 2,2, 2-trichloroethylocarbonyl phthaloyl and like groups. "Protected hydroxy" refers to a hydroxyl group substituted by any one of the commonly employed hydroxyl protecting groups such as benzyl, benzhydryl, t-butoxycarbonyl (t-BOC), benzyloxycarbonyl, 2,2,2-trichloroethyoxycarbonyl, formyl and the like. The particular amino or hydroxy protecting group employed herein on the side chain moiety is not critical, since the last step is preparing the active compounds of this invention comprises the acylation of the parent amino acid nucleus, also a compound of this invention, with a "protected" (as the case may be) acylating agent, and thus the "protection" is required only for the said acylation.

The term "a carboxylic acid protecting group" refers to the commonly used carboxylic acid protecting ester groups employed to block or protect the carboxylic acid functionality while reactions involving other functional sites of the compound are carried out. Such groups are characterized by their ease of removal by hydrolytic or hydrogenolytic methods. Examples of such groups are t-butyl, benzyl, p-methoxybenzyl, $C_2$–$C_6$ alkanoyloxymethyl, succinimidomethyl, phthalimidomethyl, p-nitrobenzyl, diphenylmethyl (benzhydryl), phenacyl, p-halo- phenacyl, 2,2,2-trichloroethyl and like ester forming moieties. The function of such groups in the present process is merely to protect the reactive carboxylic acid group and to prevent its interference by competitive reaction. The nature of such ester forming groups is not critical in the present invention so long as the ester formed therewith is stable under the process conditions described hereinafter.

In the foregoing definitions, hydroxy, amino and carboxy protecting groups are not exhaustively defined. To reiterate, the function of such groups is to protect the reactive functional groups during the preparation of the desired products and then be removed without disrupting the remainder of the molecule. Many such protecting groups are well known in the art, and the use of other groups equally applicable to the process and compounds of the present invention will be recognized as suitable.

Representative of the term "phenyl substituted by $C_1$–$C_3$ alkyl; $C_1$–$C_3$ alkoxy, nitro, fluoro, chloro, bromo, iodo, or trifluoromethyl" are groups such as 4-fluorophenyl, 3,4-dichlorophenyl, 2-bromophenyl, 4-iodophenyl, p-tolyl, xylyl, 4-ethylphenyl, 4-isopropylphenyl, 4-ethoxyphenyl, 3-methoxyphenyl, 3-nitrophenyl, 3,5-dinitrophenyl, 4-trifluoromethylphenyl, and similar groups.

Illustrative of the groups represented by $R_1$, the $C_7$ substituent in Formulae I and II, are the following: phenylacetamido, phenoxyacetamido, 2-thienylacetamido, 3-thienylacetamido, 2-furylacetamido, 4-tolylacetamido, 4-methoxy-3-ethoxyphenylacetamido, ethanamido, acetamido, butyramido, benzamido, 2-carboxybenzamido, phthalisoimido, phthalimido, maleimido, α-methylphenylacetamido, maleisoimido, α, α-dimethylphenylacetamido, α-hydroxyphenylacetamido, α-n-propylphenylacetamido, α-benzoxyphenylacetamdio, α-amino-phenylacetamido, α-amino-α-methylphenylacetamido, α-(t-butyloxycarbonylamino)-phenylacetamido, α-carboxyphenylacetamido, α-(benzhydryloxycarbonyl)phenylacetamido, α-(t-butyloxycarbonyl) phenylacetamido, 4-fluorophenoxyacetamido, 3-nitrophenoxyacetamido, 4-hydroxy-α-aminophenylacetamido, o-formylmandelamido.

It should be noted that the compounds designated by Formulae I and II above differ only in the stereochemistry at the $C_2$ and $C_3$ positions of the cepham ring system. The stereochemistry of the other positions ($C_4$, $C_6$ and $C_7$) remains unchanged from the corresponding positions in the starting penicillin sulfoxide ester. The compounds of this invention can thus be represented alternatively by the single formula

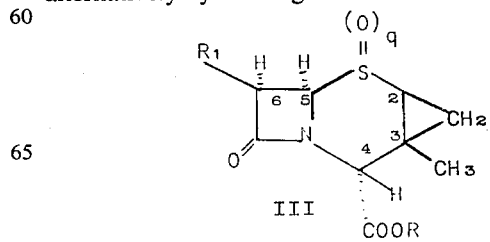

III wherein R, $R_1$ and q are as defined above. Hereinafter, when not specifically designated otherwise, it should be assumed that compound names are in reference to both the 2α,3α-methylene and 2β, 3β-methylene derivatives wherein the stereochemistry of the $C_4$, $C_6$ and $C_7$ positions are as indicated in Formula III. In the α configuration the methylene bridge has the same orientation with respect to the cepham ring system as does the $C_6$ and $C_7$ protons. A 2β, 3β-methylene group has the opposite orientation.

The compounds of the present invention of Formula III wherein $R_2$ is an imido group and q is 1 are prepared by reacting a sulfinyl chloride of the formula

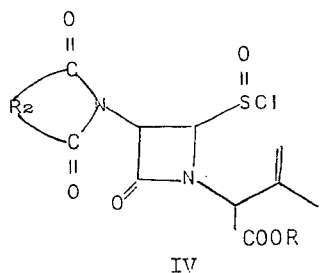

IV with at least 2 equivalents of diazomethane in an inert organic solvent at a temperature between −10° and 40°C., in which, in the above formula, $R_2$ is the residue of an imide derived from a dicarboxylic acid and R is a carboxy protecting group as defined hereinabove.

Diazomethane and the preparation and properties thereof are well known in the art. Since the sulfinyl chloride reagent of this process is a highly reactive species, it is desirable that solutions of diazomethane employed herein be alcohol free and also substantially dry. Although several different preparations of this reagent are available, the preferred route involves the reaction of N-methyl-N-nitroso urea with a base such as potassium or sodium hydroxide. The resulting solution of diazomethane in an inert, water immiscible solfent is dried over a suitable drying agent such as potassium hydroxide pellets, anhydrous magnesium sulfate, anhydrous sodium sulfate or calcium chloride. Possible solvents for the diazomethane preparation include methylene chloride, chloroform, dichloroethane, benzene, toluene, ethyl acetate, butyl acetate, diethyl ether or other like solvents. Preferred solvents for the diazomethane preparation are methylene chloride and diethyl ether. The amount of diazomethane employed in the process of the present invention can vary from about 2 equivalents to about 5 equivalents per equivalent of the sulfinyl chloride being reacted. Preferrably 2.0 to 2.5 molar equivalents of diazomethane are employed for each equivalent of sulfinyl chloride. A large excess of diazomethane may be employed, but is not advisable because of the potential hazards involved.

The sulfinyl chloride starting material designated hereinabove is prepared by reacting a 6-imido penicillin sulfoxide ester with sulfuryl chloride in an inert solvent at a temperature of about 70°–100°C. A procedure has been described in the literature [See S. Kukolja and S. R. Lammert, Angew. Chem., 12, 67–78 (1973)] for this preparation. The same general procedure can be applied in preparing the sulfinyl chlorides (other than those specified in the aforementioned publication) of Formula IV wherein $R_2$ and R are as defined hereinabove.

In general the process of this invention is carried out by adding a solution of the sulfinyl chloride in an inert organic solvent dropwise to the stirred diazomethane solution. A reverse addition, i.e., adding diazomethane to the sulfinyl chloride solution, is not desirable in this reaction. Such a reverse addition leads to the production of only small amounts of the 2,3-methylenecephams of this invention.

Solvents which may be employed in the present invention are any commonly used reaction solvents which are unreactive with the starting materials and products. Usually the sulfinyl chloride is dissolved in the same solvent as is used in the diazomethane preparation. However, this is not critical and solvents other than those designated in the above described diazomethane preparation can be employed. For example, it is quite acceptable to dissolve the sulfinyl chloride in tetrahydrofuran and add the resulting solution to a methylene chloride solution of diazomethane. Acceptable solvents to be used in dissolution of the sulfinyl chloride include, in addition to those designated in the above mentioned diazomethane preparation, solvents such as dimethylformamide, dimethylacetamide, dioxane, tetrahydrofuran and the like. The sulfinyl chloride is dissolved preferably in methylene chloride, ethyl acetate, diethyl ether or chloroform; the reaction with diazomethane is thus preferably carried out in a solvent medium comprising any one of these solvents or a mixture thereof depending on the solvent employed in the diazomethane preparation.

The temperature at which the process of the present invention is carried out can range from about −10° to about 40°C. Preferably the reaction is carried out at a temperature between 0° and 25°C. The reaction is terminated when nitrogen evolution ceases, which is usually after about 0.5 to 2.0 hours.

Preferred penicillin sulfoxide esters employed as starting materials for the forementioned process of the present invention include p-nitrobenzyl 6-phthalimido penicillinate 1-oxide, p-methoxybenzyl 6-phthalimidopenicillinate 1-oxide, methyl 6-phthalimidopenicillinate 1-oxide, and 2,2,2-trichloroethyl 6-phthalimidopenicillinate 1-oxide. The preparation of these starting materials has been described in the penicillin and cephalosporin literature. Briefly, however, this preparation involves phthaloylation of 6-APA with N-carboethoxyphthalimide according to the procedure of Y. G. Perron et al., Journal of Medicinal Chemistry, Volume 5, 1016 (1962), followed by esterification with the appropriate ester forming reagent and then oxidation to the sulfoxide with one of a number of oxidizing reagents recognized as suitable for this conversion.

In a preferred embodiment of this invention p-nitrobenzyl 6-phthalimidopenicillinate 1-oxide is converted to its respective sulfinyl chloride (Formula IV wherein R is p-nitrobenzyl and $R_2$ is 1,2-phenylene) by reaction with 1.1 equivalents of sulfuryl chloride in refluxing benzene. The sulfinyl chloride is dissolved in methylene chloride and added dropwise to a solution of about 2.5 equivalents of dried (KOH), alcohol free diazomethane in methylene chloride at 0°C. The reaction mixture was allowed to warm to room temperature and was then stirred for 1.5 hours. Evaporation of the reaction mixture gave, after chromatography, four products: a byproduct, p-nitrobenzyl 3-methyl-2-(2-chloromethylsulfoxo-4-oxo-3-phthalimido-1-azetidinyl)-3-butenoate; and the tricyclic 2,3-methylene cephams: p-nitrobenzyl 7-phthalimido-3α-methyl-2α, 3α-methylenecepham-4-carboxylate 1α-oxide, p-nitrobenzyl 7-phthalimido-3β-methyl-2α, 3α-methylenecepham-4-carboxylate 1α-oxide, and p-nitrobenzyl 7-phthalimido-3β-methyl-2α,-3α-methylenecepham-4-carboxylate 1β-oxide.

Exemplary of other products available by the hereinabove described process of this invention are in following:

p-methoxybenzyl 7-phthalimido-3-methyl-2,3-methyl-enecepham-4-carboxylate 1-oxide;

p-methoxybenzyl 7-maleimido-3-methyl-2,3-methyl enecepham-4-carboxylate 1-oxide;

2',2',2'-trichloroethyl 7-phthalimido-3-methyl-2,3-methylenecepham-4-carboxylate 1-oxide;

methyl 7-phthalimido-3-methyl-2,3-methylenecepham-4-carboxylate 1-oxide;

2',2',2'-trichloroethyl 7-maleimido-3-methyl-2,3-methylenecepham-4-carboxylate 1-oxide; and like compounds.

The 7-imido-3-methyl-2,3-methylenecepham sulfoxide esters represented by Formula III, wherein $q$ is 1, $R_1$ is imido, and R is a carboxy protecting group, are reduced via a trivalent phosphorous compound as described in U.S. Pat. No. 3,641,014, for example, to give the corresponding compounds of formula III wherein $q$ is 0. Thus the aforementioned tricyclic methylenecepham sulfoxides are easily reduced to the corresponding sulfides in high yields with phosphorous tribromide or phosphorus trichloride in dimethylformamide.

The resultant 7-imido-3-methyl-2,3-methylenecepham esters are converted to the active 7-acylamido-3-methyl-2,3-methylenecepham-4-carboxylic acids by a series of reactions comprising removal of the amino protecting group, i.e., the residue of an imide derived from a dicarboxylic acid, removal of the ester protecting group, and acylation of the resulting 7-amino functionality.

The ester group can be removed either before the removal of the amino protecting group or after the final acylation step. Removal of the ester group can be accomplished by known methods to provide the corresponding carboxylic acids. For example, when R in the Formula III is p-methoxybenzyl, the ester moiety can be removed by treatment with an acid such as trifluoroacetic acid. When R is the 2,2,2-trichloroethyl group, the group is removed by the reaction of the ester with zinc in the presence of formic acid or acetic acid. The p-nitrobenzyl group can be removed either by catalytic hydrogenolysis in the presence of palladium on carbon or by mild acid or base hydrolysis.

Removal of the amino protecting group is accomplished by the following reaction sequence: (a) basic hydrolysis (NaOH or Na₂S) of the imido group to the corresponding "amic" acid; (b) conversion of the "amic" acid to the corresponding isoimide via a dehydrating or condensing agent such as dicyclohexylcarbodiimide; and (c) treatment of the resulting isoimide with a hydrazine compound (hydrazine or methylhydrazine) to give the respective amino derivative. Removal of the phthaloyl group is exemplified by the following reaction scheme:

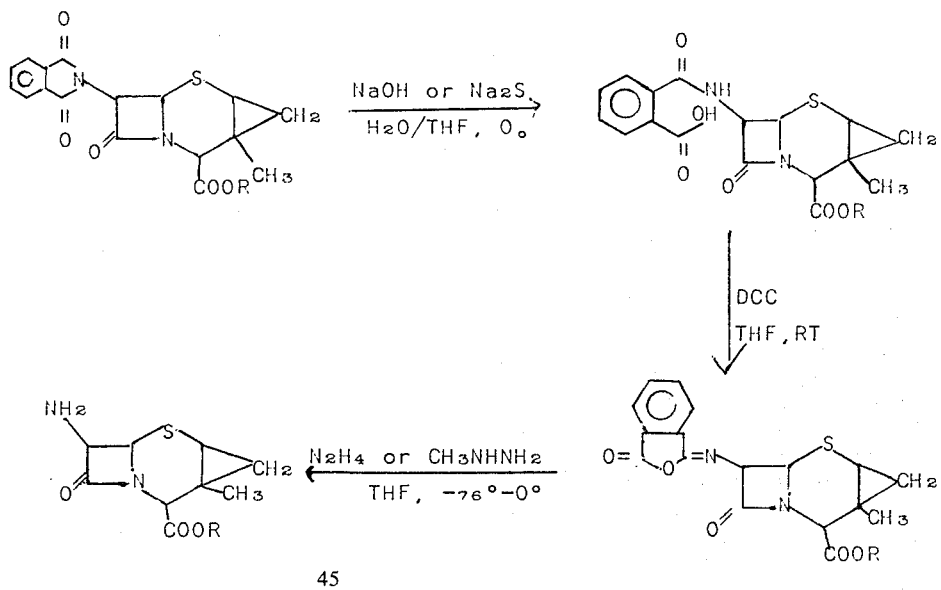

An identical procedure can be applied to the other imido groups within the scope of the invention whereby the dicarboxylic acid residue is cleaved from the imido group yielding the respective amino derivative. The first step of the imido cleavage involves the hydrolysis of the imido group to the corresponding "amic" acid. This hydrolysis is accomplished by reacting the imido compound with 1 to 4 equivalents of sodium hydroxide or sodium sulfide in aqueous tetrahydrofuran (THF) at 0–5°C. The hydrolysis is complete within 5° to 25 minutes. The "amic" acid thereby prepared is subsequently cyclized to the corresponding isoimide by reaction with one equivalent of a dehydrating agent, such as dicyclohexylcarbodiimide (DCC), in THF at room temperature. The resulting isoimide is then, without purification, treated with hydrazine or methylhydrazine in THF at −76° to 0°. The product 7-amino-3-methyl-2,3-methylene cephams are thereafter isolated by standard experimental procedures.

Acylation of the amino acid or amino ester (as the case may be depending on whether or not the ester group was removed prior to removal of the amino protecting group) may be carried out by reaction with a carboxylic acid or a reactive derivative thereof corresponding to the desired acyl moiety, according to procedures commonly practiced in the art, to provide compounds of Formula III wherein $R_1$ is acylamino. For example, the amino ester can be reacted with an acyl halide, for example, phenylacetylchloride or phenoxyacetylchloride, or a mixed anhydride derivative of the acid corresponding to the desired acyl group, in an inert anhydrous solvent in the presence of a tertiary amine such as pyridine or triethylamine to provide the acylated 2,3-methylene cepham ester. Alternatively, and also according to known methods, the amino ester can be acylated by reacting a carboxylic acid corresponding to the desired acyl group with the amino group of the amino ester in the presence of a condensing agent such as dicyclohexylcarbodiimide or 2-ethoxy-N-ethoxycarbonyl-1,2-dihydroquinoline (EEDQ). For example, phenoxyacetic acid can be reacted with the amino ester in the presence of dicyclohexylcarbodiimide under essentially anhydrous conditions to provide the 7-phenoxyacetamido ester. The amino esters can also be acylated according to methods described in U.S. Pat. No. 3,502,664. The ester group of the acylated compounds thus prepared is then removed as described hereinabove. Either simultaneously or subsequently, protecting groups of functionalities on the side chain, such as, for example, the t-butoxycarbonyl or p-nitrobenzyloxycarbonyl group used in protecting an amino or hydroxy group, can be removed by procedures which are known to those skilled in the art.

Generally the amino acid derivative of the 2,3-methylenecephams can be acylated by methods which have been employed in the acylation of 6-APA, and 7-ACA, and 7-ADCA. One such method involves the addition of an acid chloride to a suspension of the amino acid and urea in acetone. Alternatively, the amino acid can be reacted with the acid anhydride of the side chain acid in an inert anhydrous organic solvent such as acetone, ethyl acetate, methylene chloride or acetonitrile in the presence of a base such as sodium bicarbonate, pyridine, triethylamine, N-methylmorpholine or the like. Furthermore, the amino acid derivative may be acylated to give the respective acylamido acid by first reacting the 7-amino-2,3-methylenecepham acid with a silylating agent such as hexachlorodisilane to form the corresponding silyl ester which is subsequently reacted with an active ester, such as, for example, a pentachlorophenyl ester, of the side chain acid. A Schotten-Baumman type acylation may also be Schotten-Baumann wherein the amino acid is reacted with the appropriate acid chloride in aqueous acetone in the presence of sodium bicarbonate.

The product p-nitrobenzyl 7-phthalimido-3-methyl-2,3-methylenecepham-4-carboxylate 1-oxide described hereinabove in a preferred embodiment of the process of this invention is converted to biologically active 7-phenylacetamido-3-methyl-2,3-methylenecepham-4-carboxylic acid by the general procedure outlined below.

p-Nitrobenzyl 7-phthalimido-3-methyl-2,3-methylenecepham-4-carboxylate is prepared by reduction of the corresponding sulfoxide with 1 equivalent of phosphorous tribromide in dimethylformamide. Removal of the p-nitrobenzyl ester and hydrolysis of the phthalimido group to the phthalamic acid are accomplished in one step by treatment with 2 equivalents of $Na_2S.9H_2O$ in aqueous tetrahydrofuran to give the 7-(o-carboxybenzamido)-3-methyl-2,3-methylenecepham-4-carboxylic acid. Treatment of this diacid with 1 equivalent of dicyclohexylcarbodiimide in tetrahydrofuran gives the 7-phthalisoimido-3-methyl-2,3-methylenecepham-4-carboxylic acid which is treated with methylhydrazine in tetrahydrofuran at low temperature to provide the nucleus 7-amino-3-methyl-2,3-methylenecepham-4-carboxylic acid. Acylation of this product with phenylacetylchloride in aqueous acetone at 0° in the presence of sodium bicarbonate provides 7-phenylacetamido-3-methyl-2,3-methylenecepham-4-carboxylic acid.

Other compounds available employing the techniques and procedures discussed hereinabove include the following:

7-phenoxyacetamido-3-methyl-2,3-methylenecepham-4-carboxylic acid;
7-(2-thienyl)acetamido-3-methyl-2,3-methylenecepham-4-carboxylic acid;
7-($\alpha$-aminophenylacetamido)-3-methyl-2,3-methylenecepham-4-carboxylic acid;
7-($\alpha$-hydroxyphenylacetamido)-3-methyl-2,3-methylenecepham-4-carboxylic acid;
7-($\alpha$-carboxyphenylacetamido)-3-methyl-2,3-methylenecepham-4-carboxylic acid;
7-(4-hydroxy-$\alpha$-aminophenylacetamido)-3-methyl-2,3-methylenecepham-4-carboxylic acid;
7-(4-fluorophenylacetamido)-3-methyl-2,3-methylenecepham-4-carboxylic acid;
7-(4-tolylacetamido)-3-methyl-2,3-methylenecepham-4-carboxylic acid;
7-(4-methoxyphenylacetamido)-3-methyl-2,3-methylenecepham-4-carboxylic acid;
7-(4-chlorophenylacetamido)-3-methyl-2,3-methylenecepham-4-carboxylic acid, and the like.

As stated hereinabove, when not otherwise indicated compound names refer to both the $2\alpha,3\alpha$-methylenecepham and $2\beta,3\beta$-methylenecepham isomers.

The free acids of this invention form carboxylate salts with any of a variety of inorganic and organic bases. Pharmaceutically accetable carboxylate salts are formed by reacting the free acids with such bases as sodium hydroxide, sodium carbonate, sodium bicarbonate, potassium hydroxide, potassium 2-ethylhexanoate, calcium carbonate, ethylamine, 2-hydroxyethylamine and the like. Preferred carboxylate salt forms are the alkali metal salts. For formation of the potassium salt a preferred base is potassium 2-ethylhexanoate. The carboxylate salts can be converted to the free acids by acidification. The free adids and their carboxylate salts differ somewhat in solubility properties but, in general, are otherwise equivalent for the purposes of the invention.

The 7-acylamino compounds prepared from intermediates provided by the process of this invention possess antibiotic activity and are useful in inhibiting the growth of and combatting infections due to gram-positive and to some extent gram-negative microorganisms. Data obtained employing the standard disc plate method showed the 7-acylamino compounds of this invention active at 2 mg./ml. in the disc assay. When comparing compounds differing only in the configuration at the 2,3-methylene position on the cepham ring, the $2\beta,3\beta$-methylenecepham isomer exhibited a higher level of antibiotic activity. Illustrative of the activity of the compounds of this invention are the data in Table I showing the activity of the isomers of 7- phenylacetamido-3-methyl-2,3-methylenecepham-4-carboxylic acid.

Table I[1]

| Configuration of 2,3-methylenecepham | Zone of Inhibition (diameter in mm)[2] | | | | | |
|---|---|---|---|---|---|---|
| | Staphylococcus aureus | Bacillus subtilis | Sarcina lutea | Proteus vulgari | Escherichi coli | Serratia marcescens |
| 2β,3β-methylene | 28 | 30 | 23 | 12 | 10 | H10 |
| 2α,3α-methylene | 21 | 17 | 11 | — | — | tr |

[1]Data obtained on 7-phenylacetamido-3-methyl-2,3-methylenecepham-4-carboxylic acid at a concentration of 2 mg./ml.
[2]A dash indicates no observed zone of inhibition.
tr indicates a trace of zone inhibition.
H indicates a haze or not a clear zone.

The aforementioned salts, for example, the sodium and potassium salts, likewise exhibit antibiotic activity and can be employed as well as the respective acids in suitable pharmaceutical formulations for combatting infections in warm blooded mammals by administration parenterally at a dose between 100 and 2000 mg./kg. of body weight.

The following detailed examples are provided to further illustrate the present invention.

EXAMPLE 1 p-Nitrobenzyl 7-phthalimido-3-methyl-2,3-methylenecepham-4-carboxylate, 1-oxide.

The intermediate p-nitrobenzyl 3-methyl-2-(2-chlorosulfinyl-4-oxo-3-phthalimido-1-azetidinyl)-3-butenoate was prepared by adding freshly distilled sulfuryl chloride (2.0 ml., 25 mmol.) in 50 ml. of dry (4A molecular sieves) benzene dropwise to a refluxing solution of 4-nitrobenzyl 6-phthalimidopenicillinate, 1-oxide (0.04 grams, 20 mmol) and 10 grams of dry powdered sodium bicarbonate in 450 ml. of dry benzene. The mixture was refluxed under a nitrogen atmosphere for 1 hour, cooled, and filtered. Evaporation of the filtrate to dryness in vacuo gave a cream colored foam, the nmr spectrum of which was good for the desired sulfinyl chloride intermediate: nmr (CDCl$_3$) 118 (s, 3, CH$_3$), 300–320 (m, 3, olefinic CH$_2$ and carboxy α-H), 324 (s, 2, ester CH$_2$), 342 (d, 1, J=5.0 Hz), 356 (d, 1, J=5.0 Hz) and 450–500 Hz (m, 8, ArH).

Diazomethane in methylene chloride was prepared as follows. (Note: This procedure was carried out in duplicate and the resulting diazomethane solutions combined before reaction with the sulfinyl chloride.) A solution of 46 grams potassium hydroxide in 60 ml. of water was cooled to 0°–5°C. in an ice bath, and 100 ml. of cold methylene chloride was added. To the resulting two-phase mixture, a slurry of 5.0 grams of N-methyl-N-nitrosourea in 75 ml. cold methylene chloride in was added ca. 20 ml. portions over a 20 minute period. The mixture at 0°–5° was swirled every 10 minutes for 2 hours. The yellow methylene chloride layer was separated, dried twice over potassium hydroxide pellets, and combined with that from a second preparation in a 1-liter round bottom flask.

The sulfinyl chloride product from above was dissolved in 200 ml. methylene chloride and added dropwise over 20 minutes to the magnetically stirred diazomethane solution. Vigorous nitrogen evolution was noted. After 2 hours at room temperature the methylene chloride was evaporated in vacuo from the reaction mixture to give a tan colored foam. The crude product mixture was chromatographed on a 5 × 37 cm. silica gel column (washed with 500 ml. 3% acetic acid in benzene) developed with benzene (1 liter), 7% acetone/benzene (2 liters), 15% acetone/benzene (3–4 liters), 20% acetone/benzene (2 liters) and 25% acetone/benzene (1 liter) taking 20 ml. fractions every 11 minutes. The products were eluted from the column in the order in which they are described below.

p-nitrobenzyl 3-methyl-2-(2-chloromethylsulfoxo-4-oxo-3-phthalimido-1-azetidinyl)-3-butenoate (2.9 g., 27%): recrystallized from chloroform, mp 177.5°–178.5°C; nmr (CDCl$_3$) 120 (s, 3, —CH$_3$), 268 and 254 (ABq, 2, J=11 Hz, S—CH$_2$), 310 (m, 4, olefinic CH$_2$, allylic H and azetidinone H), 326 (s, 2, ester CH$_2$), 344 (d, 1, J=5 Hz, azetidinone H) and 450–500 Hz (m, 8, ArH).

Analysis Calcd. for C$_{24}$H$_{20}$ClN$_3$O$_8$S: C, 52.80; H, 3.69; Cl, 6.49; N, 7.70; O, 23.44; S, 5.87. Found: C, 52.66; H, 3.53; Cl, 6.76; N, 7.97; O, 23.27; S, 5.93.

p-Nitrobenzyl 7-phthalimido-3α-methyl-2β,3β-methylenecepham-4-carboxylate, 1α-oxide (1.2 g., 12%): m.p. 272–273 (decomp); ir (KBr) 1800 and 1735 (phthalimido C=O), 1782 (azetidinone C=O) and 1730 cm$^{-1}$ (ester C=O); nmr (TFA) 79 (s, 3, CH$_3$), 92 and 120 (m's, 2, cyclopropyl CH$_2$), 173 (q, 1, J=6 Hz and J=9.5 Hz, C$_2$—H), 310 (s, 1, C$_4$—H), 320 (d, 1, J=4.2 Hz), 334 (s, 2, ester CH$_2$), 361 (d, 1, J=4.2 Hz, azetidinone H) and 450–510 Hz (m, 8, ArH); NOE (C$_2$—H, C$_3$—CH$_3$) trace.

Analysis Calc. for C$_{24}$H$_{19}$N$_3$O$_8$S: C, 56.58; H, 3.76; N, 8.25; O, 25.12; S, 6.29. Found: C, 56.82; H, 3.80; N, 8.19; O, 24.12; S, 6.40.

p-Nitrobenzyl 7-phthalimido-3β-methyl-2α,3α-methylenecepham-4-carboxylate, 1α-oxide (2.1 grams, 20%): colorless needles from ethylacetate/cyclohexane, m.p. 236.5–238 (decomp); ir (KBr) 1785 (azetidinone C=O), 1740 and 1802 (phthalimido C=O), and 1750 cm$^{-1}$ (ester C=O); nmr (CDCl$_3$) 95 (s, 3, C$_3$—CH$_3$), 75 (m, 2, cyclopropyl CH$_2$), 165 (q, 1, J=6.5 and 8.5 Hz), 268 (d, 1, J=4.0 Hz, azetidinone H), 288 (s, 1, C$_4$—H), 126 (s, 2, ester CH$_2$), 362 (d, 1, J=4.0 Hz, azetidinone H), and 450–500 Hz (m, 8, ArH); NOE (C$_4$—H, C$_3$—CH$_2$) 8%.

Analysis Calcd. for C$_{24}$H$_{19}$N$_3$O$_8$S: C, 56.58; H, 3.76; N, 8.25. Found: C, 56.83; H, 3.79; N, 8.43.

p-Nitrobenzyl 7-phthalimido-3β-methyl-2α,3α-methylenecepham-4-carboxylate, 1β-oxide (200 mg., 2%): tan crystals from acetone, m.p. 237°–238°λ (decomp); ir (KBr) 1785 (azetidinone C=O), 1740 and 1802 (phthalimido C=O), and 1750 cm$^{-1}$ (ester C=O); nmr (TFA) 101 (s, 3, C$_3$—CH$_3$), 82 (m, 2, cyclopropyl CH$_2$), 174 (q, 1, J=6.0 and 9.0 Hz, C$_2$—H), 303 (d, 1, J=3.8, azetidinone H), 323 (s, 1, C-H), 367 (d, 1, J=3.8, azetidinone H), and 470–510 Hz (m, 8, ArH); NOE (C$_4$—H, C$_3$—CH$_3$) 11%.

Analysis Calcd. for $C_{24}H_{19}N_3O_{18}S$: C, 56.58; H, 3.76; N, 8.25; S, 6.29. Found: C, 56.81; H, 4.03; N, 7.99; S, 6.34.

EXAMPLE 2 p-Nitrobenzyl 7-phthalimido-3α-methyl-2β,3β-methylenecepham-4-carboxylate.

To a solution of p-nitrobenzyl 7-phthalimido-3α-methyl-2β,3β-methylenecepham-4-carboxylate, 1α-oxide (1.02 g., 2mmol.) in 12 ml. dimethylformamide at room temperature was added phosphorous tribromide (0.2 ml., 2mmol.). After 20 minutes at room temperature the volume of the reaction mixture was reduced in vacuo to ca, 5 ml. Ethyl acetate (30 ml.) was added and the resulting solution was washed successively with 0.05 N HCl (3 × 25 ml.), 5% $NaHCO_3$ solution (30 ml.) and brine (20 ml.) and dried ($MgSO_4$). Evaporation in vacuo gave 923 mg. (94%) of an amorphous solid identified as p-nitrobenzyl 7-phthalimido-3α-methyl-2β,3β-methylenecepham-4-carboxylate: ir ($CHCl_3$) 1788 (azetidinone C=O), 1738 and 1800 (phthalimido C=O), and 1760 $cm^{-1}$ (ester C=O); nmr ($CDCl_3$) 88 (s, 3, $C_3$—$CH_3$), 50–96 (m, 2, cyclopropyl $CH_2$), 114 (q, 1, J=5.5 and 8.0 Hz, $C_2$—H), 294 (s, 1, $C_4$—H), 317 (d, 1, J=4.0 Hz, azetidinone H), 325 (s, 2, ester $CH_2$) 330 (d, 1, J=4.0 Hz, azetidinone H), and 370–505 Hz (m, 8, ArH); mass spectrum (m/e) 493, $m^+$.

Analysis Calcd. for $C_{24}H_{19}N_3O_7S$: C, 58.41; H, 3.88; N, 8.51; O, 22.69; S, 6.50. Found: C, 57.87; H, 4.00; N, 8.18; O, 22.26; S. 6.40.

EXAMPLE 3 p-Nitrobenzyl 7-phthalimido-3β-methyl-2α,3α-methylenecepham-4-carboxylate.

The procedure defined in example 2 was followed except that p-nitrobenzyl 7-phthalimido-3β-methyl-2α,3α-methylenecepham-4-carboxylate, 1α-oxide was used as the starting material. There was obtained as product p-nitrobenzyl 7-phthalimido-3β-methyl-2α,3α-methylenecepham-4-carboxylate (940 mg., 94%): ir ($CHCl_3$) 1788 (azetidinone C=O), 1739 and 1799 (phthalimido C=O), and 1765 $cm^{-1}$ (ester C=O); nmr ($CDCl_3$) 94 (s, 3, $C_3$—$CH_3$), 33–84 (m, 2, cyclopropyl $CH_2$), 111 (q, 1, J=5.5 Hz and 9.5 Hz, $C_2$—H) , 304 (s, 1, $C_4$—H), 305.5 (d, 1, J=4.0 Hz, azetidinone H), 323 (s, 2, ester $CH_2$), 338.5 (d, 1, J=4.0 Hz, azetidinone H), and 450–500 Hz (m, 8, ArH); mass spectrum (m/e) 493 ($M^+$).

Analysis Calcd. for $C_{24}H_{14}N_3O_7S$: C, 58.41; H, 3.88; N, 8.51, O, 22.69; S, 6.50. Found: C, 58.12; H, 3.87; N, 8.87; O, 22.52; S, 6.88.

EXAMPLE 4 p-nitrobenzyl 7-phthalimido-3β-methyl-2α,3α-methylenecepham-4-carboxylate.

The procedure of example 2 was followed except that p-nitrobenzyl 7-phthalmiido-3β-2α,3α-methylenecepham-4-carboxylate, 1β-oxide was used as the starting material. The product p-nitrobenzyl 7-phthalimido-3β-methyl-2α,3α-methylenecepham-4-carboxylate was isolated in 93% yield.

EXAMPLE 5

7-Phthalimido-3α-methyl-2β,3β-methylenecepham-4-carboxylic acid.

p-Nitrobenzyl 7-phthalimido-3α-methyl-2β,3β-methylenecepham-4-carboxylate (200 mg.) in 5 ml. tetrahydrofuran was added to a prereduced suspension of 250 mg. of 5% paladium on carbon in 15 ml. ethanol under 1 atm. of hydrogen (Brown Hydrogenator) at room temperature. After stirring for 1 hour the mixture was filtered through a Celite filter pad and the filtrate evaporated in vacuo to dryness. The crude product was dissolved in 20 ml. ethyl acetate and the resulting solution extracted with 5% sodium bicarbonate solution (2 × 10 ml.). The aqueous extracts were combined and washed with 15 ml. ethyl acetate. The pH was adjusted to 2.5 with 1N HCl The aqueous solution was then extracted with 20 ml. of ethyl acetate. The organic extract was separated, washed with brine (20 ml.), dried ($MgSO_4$), and evaporated in vacuo to dryness giving (80 mg., 55%) of a white foam identified as 7-phthalimido-3α-methyl-2β,3β -methylenecepham-4-carboxylic acid: ir (KBr) 1790 (azetidinone C=O), 1801 and 1750 (phthalimido C=O) and 1740 $cm^{-1}$ (carboxylic acid C=O) and 1740 $cm^{-1}$ (carboxylic acid C=O); nmr ($CDCl_3$) 85 (s, 3, $C_3$—$CH_3$), 50–90 (m, 2, cyclopropyl $CH_2$), 114 (q, 1, J=5.5 and 8.0 Hz $C_2$—H), 291 (s, 1, $C_4$—H), 318 (d, 1, J=4.0 Hz, azetidinone H), 333 (d, 1, J=4.0 Hz, azetidinone H) and 473 Hz (m, 4, ArH); mass spectrum (m/e) 358 ($M^+$), 330 ($M^+$, CO).

EXAMPLE 6

7-Phthalimido-3β-methyl-2α,3α-methylenecepham-4-carboxylic acid.

The same procedure was followed as described in example 5 for the corresponding 2β,3β-methylene isomer. p-Nitrobenzyl-7-phthalimido-3β-methyl-2α,3α-methylenecepham-4-carboxylate was used as the starting material. The reduction gave 7-phthalimido-3β-methyl-2α,3α-methylenecepham-4-carboxylic acid in 45% yield: ir (KBr) 1785 (azetidinone C=O), 1797 and 1750 (phthalimido C=O), and 1738 $cm^{-1}$ (acid C=O); nmr ($CDCl_3$) 94 (s, 3, C—$CH_3$), 50–84 (m, 2, cyclopropyl $CH_2$), 112 (q, 1, J=6.0 and 7.5 Hz, $C_2$—H), 298 (s, 1, $C_4$—H), 301 (d, 1, J=4.0 Hz, azetidinone H), 338 (d, 1, J=4.0 Hz, azetidinone H) and 471 Hz (m, 4, ArH); mass spectrum (m/e) 358 ($M^+$, CO).

EXAMPLE 7

7-(2-Carboxybenzamido)-3β-methyl-2α,3α-methylenecepham-4-carboxylic acid.

Water was added to a solution of p-nitrobenzyl 7-phthalimido-3β-methyl-2α,3α-methylenecepham-4-carboxylate (986 mg., 2 mmol.) in 12 ml. tetrahydrofuran at 0° until the cloud point was reached. Then 2 ml. tetrahydrofuran was added to dissipate the cloudiness. A solution of $Na_2S.9H_2O$ (960 mg., 4 mmol.) in 8 ml. water was added dropwise to the stirred aqueous tetrahydrofuran solution. After 25 minutes at 0°, 4 ml. of 1N. HCl was added to the reaction mixture, the volume of which was then reduced in vacuo to ca. 6 ml. Water (15 ml.) was added, and the pH was adjusted to 8.0 with sodium bicarbonate. The aqueous solution was washed with ethyl acetate (2 × 25 ml.) and then slurried with 30 ml. ethyl acetate while the pH was adjusted to 2.0 with conc. HCl. the theyl acetate layer was separated, washed with brine and dried (MgSO$_4$). Evaporation in vacuo gave 730 mg. (97%) of a tan amorphous solid (chloroform insoluble-acetone soluble): nmr (acetone D-6) 84 (s, 3, C$_3$—CH$_3$), 50-80 (m, 2, cyclopropyl CH$_2$), C$_2$—H barely visible as a quartet under acetone solvent signal, 278 (s, 1, C$_4$—H), 301 (d, 1, J=4.0 Hz, azetidinone H), 339 (q, 1, J=4.0 Hz and 8.0 Hz), 458 and 471 (m's, 4, ArH), 500 (d, 1, J=8.0 Hz, exchangeable, NH) and 543 Hz (s, 1, exchangeable).

EXAMPLE 8

7-(2-Carboxybenzamido)-3α-methyl-2β,3β-methylenecepham-4-carboxylic acid

The same procedure was followed as described for the preparation of the corresponding 2α,3α-methylene isomer. p-Nitrobenzyl 7-phthalimido-3α-methyl-2β,3β-methylenecepham-4-carboxylate was used as the starting material. The hydrolysis gave 7-(2-carboxybenzamido)-3α-methyl-2β,3β-methylenecepham-4-carboxylic acid in 94% yield: nmr (acetone D-6) 72 (s, 3, C$_3$—CH$_3$), 35-80 (m, 2, cyclopropyl CH$_2$), C$_2$—H quartet obscured by acetone solvent signal, 268 (s, 1, C$_4$—H), 314 (d, 1, J=4.0 Hz, azetidinone H), 335 (q, 1, J=4.0 Hz and J=8.0 Hz, azetidinone H), 459 and 475 (m's, 4, ArH), 440 (broad s, 1, acid H) and 500 Hz (d, 1, J=8.0 Hz, exchangeable NH). No attempt was made to purify this crude product before use in the next step of the phthaloyl removal.

EXAMPLE 9

7-(2-Carboxybenzamido)-3β-methyl-2α,3α-methylenecepham-4-carboxylic acid

A solution of 7-phthalimido-3β-methyl-2α,3α-methylenecepham-4-carboxylic acid (179 mg., 0.5 mmol.) in 5 ml. tetrahydrofuran was added dropwise to a solution of Na$_2$S.9H$_2$O (240 mg., 1 mmol.) in 10 ml. water at 0°C. After 15 min. at 0° 1 ml. 1N.HCl was added and the tetrahydrofuran was removed from the reaction mixture in vacuo. The resulting aqueous solution (pH 8.0) was washed with ethyl acetate (15 ml.). The aqueous layer was slurried with 15 ml. ethyl acetate while the pH of the mixture was adjusted to 2.0. The ethyl acetate layer was separated, washed with brine, dried (MgSO$_4$) and evaporated to dryness in vacuo to give 7-(2-carboxybenzamido)-3β-methyl-2α,3α-methylenecepham-4-carboxylic acid.

EXAMPLE 10

7-phthalisoimido-3β-methyl-2α,3α-methylenecepham-4-carboxylic acid

Dicyclohexylcarbodiimide (103 mg., 0.5 mmol.) in 1 ml. tetrahydrofuran was added to a solution of 7-(2-carboxybenzamido)-3β-methyl-2α,3α-methylenecepham-4-carboxylic acid (crude product from hydrolysis step, 188 gm., 0.5 mmol.) in 5 ml. of tetrahydrofuran at room temperature. After the reaction mixture was stirred for 40 minutes at room temperature, the dicyclohexylurea precipitate was filtered from the mixture, and the filtrate was evaporated in vacuo to dryness to give a tan colored foam. An nmr spectrum of the crude product indicated a trace of unreacted dicyclohexylcarbodiimide (DCC) as well as a major product identified as 7-phthalisoimido-3β-2α,3α-methylenecepham-4-carboxylic acid: nmr (CDCl$_3$) 87 (s, 3, C$_3$—CH$_3$), 50–90 (m, 2, cyclopropyl CH$_2$, C$_2$—H quartet hidden by DCC signals, 286 (s, 1, C$_4$—H), 306 and 339 (d's, 1 each, J=4.2 Hz, azetidinone H's) and 476 Hz (m, 4, ArH). The yield was virtually quantitative.

EXAMPLE 11

7-Phthalisoimido-3α-methyl-2β,3β-methylenecepham-4-carboxylic acid.

The same procedure was followed as described in Example 10 for the preparation of the corresponding 2α,3α-methylene isomer. A trace of dicyclohexylcarboiimide (DCC) was detected in the nmr spectrum of the crude 7-phthalisoimido-3α-methyl-2β,3β-methylenecepham-4-carboxylic acid: nmr (CDCl$_3$) 74 (s, 3, C$_3$—CH$_3$), 55–80 (m, 2, cyclopropyl CH$_2$), C$_2$—H quartet obscured by DCC impurities), 262 (s, 1, C$_4$—H), 316 (d, 1, J=4.0 Hz), 334 (d, 1, J=4.0 Hz) and 470 Hz (m, 4, ArH). The yield of this crude product was almost quantitative. This product was not purified before use in the next step of the phthaloyl group cleavage.

EXAMPLE 12

7-Phenylacetamido-3β-methyl-2α,3α-methylenecepham-4-carboxylic acid.

A solution of 7-phthalisoimido-3β-methyl -2α,3α-methylenecepham-4-carboxylic acid (prepared from 0.5 mmol. of the corresponding diacid and DCC as in example 10) in 10 ml. tetrahydrofuran was cooled in a dry ice/acetone bath to −60° to −70°C. Methylhydrazine (.053 ml., 1 mmol.) in 1.5 ml. tetrahydrofuran was added dropwise. The mixture was stirred at −70° for 5 minutes and then allowed to warm for −5° to 0° before 2 ml. of water was added. After the mixture was held for 2 minutes at 0°, 1.5 ml. 1N. HCl was added and the mixture was then allowed to warm to room temperature. Water (4 ml.) was added and the volume of the mixture was reduced in vacuo to ca. 10 ml. The aqueous solution (pH 1.5) was filtered to give N-methylphthalydrazide. The filtrate was washed with ethyl acetate (2 × 10 ml.), the pH adjusted to 8.2 with 0.5 N.NaOH, and the filtrate washed again with ethyl acetate (10 ml.). Finally the pH was adjusted back to 4.0. Evaporation of the aqueous solution in vacuo gave a tan amorphous solid. This product was dissolved in a mixture of 4 ml. of water, 120 mg. sodium bicarbonate, and 3 ml. of acetone at 0°C. Phenylacetylchloride (154 mg., 1 mmol.) in 2 ml. of acetone was added to the mixture. After stirring in the cold for 3.5 hours, the acetone was evaporated in vacuo leaving an aqueous solution to which 4 ml. of water was added. The pH was adjusted to 8.0 with 1N.NaOH and the resulting aqueous solution was washed with ethyl acetate (2 × 10 ml.). The aqueous solution was layered with 15 ml. ethyl acetate while the pH was adjusted to 2.0 with 1N.HCl. The organic layer was separated washed with brine, dried (MgSO$_4$) and evaporated in vacuo to dryness, yielding a resinous, colorless product. An nmr spectrum indicated a quantity of phenylacetic acid mixed with the desired product. The phenylacetic acid impurity was removed by trituration with a 3:1 diethylether/cyclohexane mixture giving 90 mg. (53% from diacid) of 7-phenylacetamido-3β-methyl-2α,3α-methylenecepham-4-carboxylic acid: ir (CHCl$_3$) 1780 (azetidinone C=O), 1738 (acid C=O) and 1690 cm$^{-1}$ (amide C=O); nmr (CDCl$_3$) 81 (s, 3, C$_3$—CH$_3$), 60–80 (m, 2, cyclopropyl CH$_2$), 109 (q, 1, J=5.0 and 8.0 Hz, C$_2$—H), 220 (s, 2, amide CH$_2$), 277 (s, 1, C—H), 290 (d, 1, J=4.0 Hz, azetidinone H), 235 (q, 1, J=4.0 and 8.5 Hz, azetidinone H), 394 (d, 1, J=8.5 Hz exchangeable NH), 439 Hz (s, 5, ArH), and 570 Hz (broad s, acid H); mass spectrum (m/e) 346 (M+), 328 (M+, H₂O) and 300 (M+,H₂O, CO).

An analytical sample was prepared by dissolving the product in diethylether and precipitating with cyclohexane.

Analysis Calcd. for $C_{17}H_{18}N_2O_4S$: C, 58.94; H, 5.24; H, 8.90. Found: C, 58.99; H, 5.07; N, 7.83.

EXAMPLE 13

7-Phenylacetamido-3α-methyl-2,3β-methylenecepham-4-carboxylic acid

The same procedure was followed as described in example 12 except that 7-(2-carboxybenzamido)-3α-methyl-2β,3β-methylenecepham-4-carboxylic acid was used as the starting material instead of the corresponding 2α,3α-methylene isomer. The following physical chemistry data was obtained on the product, 7-phenylacetamido-3α-methyl-2β,3β-methylenecepham-4-carboxylic acid: ir (CHCl₃) 1787 (azetidinone C=O), and 1690 cm⁻¹ (amide C=O); nmr (CDCl₃) 69 (s, 3, $C_3$—$CH_3$), 28–70 (m, 2, cyclopropyl $CH_2$), 110 (q, 1, J=5.5 and 7.5 Hz, $C_2$—H), 219 (s, 2, amide $CH_2$), 267 (s, 1, $C_4$—H), 303 (d, 1, J=4.0 Hz, azetidinone H), 321 (q, 1, J=4.0 and 8.0 Hz, azetidinone H), 415 (d, 1, J=8.0, exchangeable NH), and 438 Hz(s, 5, ArH); mass spectrum (m/e) 346 (M+), 328 (M+, H₂O), 300 (M+, H₂O, CO).

Analysis Calcd. for $C_{17}H_{18}N_2O_4S$: C, 58.94; H, 5.24; N, 8.09. Found: C, 59.16; H, 5.36; N, 7.85.

EXAMPLE 14

Methyl 7-phthalimido-3-methyl-2,3-methylenecepham-4-carboxyliate, 1-oxide.

The same procedure as described in example 1 was followed using 1.880 g. (5 mmol.) methyl 6-phthalimidopenicillinate sulfoxide as the starting material to prepare the methyl 3-methyl-2-(2-chlorosulfinyl-4-oxo-3-phthalimido-1-azetidinyl)-3-butenoate (Angew. Chem. Internat. Edit., pp. 67–68, 12, Number 1 (1973)). Treatment of a solution of the product in ethyl acetate at 0°C. with excess ethereal diazomethane gave, after chromatography over a silica gel column developed with benzene-ethyl acetate, the following products: (listed in order of their elution from the column) methyl 3-methyl-2-(2-chloromethylsulfoxo-4-oxo-3-phthalimido-1-azetidinyl)-3-butenoate (1.09 g., 51.5%) as a mixture of isomers at sulfur and at double bond: ir (CHCl₃) 1783 (azetidinone C=O), 1800 and 1745 (phthalimido C=O) and 1730 cm⁻¹ (ester C=O); nmr (CDCl₃) complex because of isomer mixture.

Analysis Calcd. for $C_{18}H_{17}H_2ClO_6S$: C, 50.89; H, 4.03; N, 6.59; Cl, 8.34; O, 22.59; S, 7.55. Found: C, 50.90; H, 4.33; N, 6.41; Cl, 8.51; O, 22.87; S, 7.72.

Methyl 7-phthalimido-3α-methyl-3β,3β-methylenecepham-4-carboxylate, 1α-oxide (170 mg., 8.8%): recrystallized from ethyl acetate/ether, m.p. 214–216.5; ir (CHCl₃) 1785 azetidinone C=O) 1796 and 1742 (phthalimido C=O) and 1732 cm⁻¹ (ester C=O); nmr (CDCl₃) 73 (s, 3, $C_3$—$CH_3$), 71 and 118 (m, 2, cyclopropyl $CH_2$), 156 (q, 1, J=5.5 Hz and 10 Hz), 230 (s, 3, ester $CH_3$), 284 (d, 1, J=4.8 Hz), 289 (s, 1, $C_4$—H) 335.5 (d, 1, J=4.8 Hz, azetidinone H) and 467 Hz (m, 4, ArH); NOE ($C_3$—$CH_3$, $C_4$—H) None.

Analysis Calcd. for $C_{18}H_{16}N_2O_6S$: C, 55.66; H, 4.15; N, 7.21; O, 24.72; S, 8.26. Found: C, 55.78; H, 4.08; N, 7.53; O, 24.52; S, 8.02.

Methyl 7-phthalimido-3β-methyl-2α,3α-methylenecepham-4-carboxylate, 1α-oxide (220 mg., 11.3%): recrystallized from ethyl acetate/ether, m.p. 189.5°: ir (CHCl₃) 1798 and 1743 (phthalimido C=O), 1788 (azetidinone C=O), and 1734 cm⁻¹ (ester C=O); nmr (CDCl₃) 95 (s, 3, $C_3$—$CH_3$), 64–96 (m, 2, cyclopropyl $CH_2$), 162 (q, 1, J=9.5 Hz and 6.0 Hz), 232 (s, 3, ester $CH_3$), 266 (d, 1, J=4.3 Hz), 280 (s, 1, $C_4$—H), 358 (d, 1, J=4.3 Hz, azetidinone H), and 472 Hz (m, 4, ArH); NOE ($C_4$—$CH_3$, $C_4$—H) 13.3%.

Analysis Calcd. for $C_{18}H_{16}N_2O_6S$: C, 55.62; H, 4.15; N, 7.21; O, 24.72; S, 8.26. Found: C, 55.32; H, 4.24; N, 7.14; O, 24.50; S, 8.32.

EXAMPLE 15

The same procedure as described in example 1 was followed except that carbon tetrachloride was used as the solvent for the preparation of the intermediate p-methoxybenzyl 3-methyl-2-(2-chlorosulfinyl-4-oxo-3-phthalimido-1-azetidinyl)-3-butenoate from p-methoxybenzyl 6-phthalimidopenicillinate S-oxide. The intermediate sulfinyl chloride was reacted with 2.0–2.5 equivalents of ethereal diazomethane. Chromatography gave a. p-methoxybenzyl 3-methyl 2-(2-chloromethylsulfoxo-4-oxo-3-phthalimido-1-azetidinyl)-3-butenoate;

b. p-methoxybenzyl 7-phthalimido-3α-methyl-2β,3β-methylenecepham-4-carboxylate, 1α-oxide;

c. p-methoxybenzyl 7-phthalimido-3β-methyl-2α,3α-methylenecepham-4-carboxylate, 1α-oxide; and d. p-methoxybenzyl 7-phthalimido-3β-methyl-2α,3α-methylenecepham-4-carboxylate, 1β-oxide.

We claim:

1. The compound of the formula

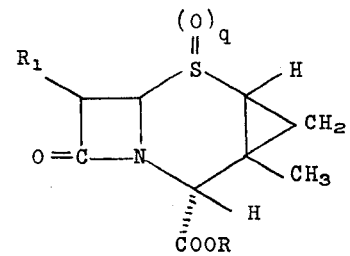

wherein

R is hydrogen, an alkali metal cation or a carboxylic acid protecting group;

R₁ is amino, $C_1$–$C_7$ alkanamido, benzamido, 2-carboxybenzamido, phthalisoimido or a group represented by the formula

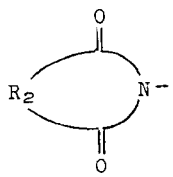 or 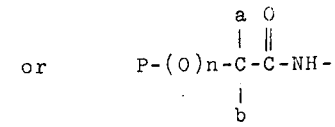

wherein

R₂ is $C_2$–$C_4$ alkylene, 1,2-phenylene or 1,2-cyclohexenylene;

P is 2-thienyl, 3-thienyl, 2-furyl, 3-furyl, phenyl or substituted phenyl wherein the substituent is $C_1$–$C_3$ alkoxy, nitro, fluoro, chloro, bromo, iodo, or trifluoromethyl;

$n$ is 0 or 1; $a$ is hydrogen or $C_1$–$C_3$ alkyl; $b$ is hydrogen, $C_1$–$C_3$ alkyl, hydroxy, protected hydroxy, amino, protected amino, carboxy or protected carboxy; with the limitation that when n is 1, P is phenyl or substituted phenyl wherein the substituent is $C_1$–$C_3$ alkyl, $C_1$–$C_3$ alkoxy, nitro, fluoro, chloro, bromo, iodo, or trifluoromethyl, and b is hydrogen or $C_1$–$C_3$ alkyl; and $q$ is 1 or 0.

2. The compound of claim 1 wherein $q$ is 1.
3. The compound of claim 2 wherein R is methyl, p-nitrobenzyl, p-methoxybenzyl or 2,2,2-trichloroethyl.
4. The compound of claim 3 wherein $R_2$ is 1,2-phenylene.
5. The compound of claim 4 wherein R is p-nitrobenzyl.
6. The compound of claim 1 wherein $q$ is 0.
7. The compound of claim 6 wherein $R_2$ is 1,2-phenylene and R is p-nitrobenzyl or hydrogen
8. The compound of claim 6 wherein $R_1$ is amino, 2-carboxybenzamido, phthalisoimido, phenoxyacetamido, phenylacetamido, 2-thienylacetamido α-aminophenylacetamido, 4-hydroxy-α-aminophenylacetamido, 4-fluorophenylacetamido, α-hydroxyphenylacetamido, 4-tolylacetamido, 4-methoxyphenylacetamido, α-carboxyphenylacetamido, 4-chlorophenylacetamido, and R is hydrogen or a sodium or potassium cation.
9. The compound of claim 8 wherein R is amino, 2-carboxybenzamido, phthalisoimido, 2-phenoxyacetamido or 2-phenylacetamido.
10. The compound of claim 9 wherein the compound is 7-phenylacetamido-3-methyl-2,3-methylenecepham-4-carboxylic acid.
11. The process for preparing the compound of claim 2, which comprises reacting a sulfinyl chloride of the formula

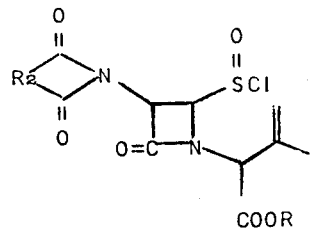

with at least two equivalents of diazomethane in an inert organic solvent at a temperature between −10° and 40°C., in which, in the above formula $R_2$ is the residue of an imide derived from a dicarboxylic acid and R is a carboxy protecting group.

12. The process of claim 11 wherein $R_2$ is $C_2$–$C_4$ alkylene, 1,2-phenylene or 1,2-cyclohexenylene.
13. The process of claim 12 wherein R is t-butyl, 2,2,2-trihaloethyl, benzyl, p-nitrobenzyl, succinimidomethyl, phthalimidomethyl, p-methoxybenzyl, benzhydryl, $C_2$–$C_6$ alkanoyloxymethyl, phenacyl, or p-halophenacyl.
14. The process of claim 13 wherein the reaction is carried out at a temperature of 0° to 25°C.
15. The process of claim 14 wherein the solvent medium for the reaction comprises methylene chloride, ethyl acetate, diethyl ether, or chloroform.
16. The process of claim 15 wherein $R_2$ is 1,2-phenylene.
17. The process of claim 16 wherein R is p-nitrobenzyl, p-methoxybenzyl, or 2,2,2-trichloroethyl.
18. The process of claim 17 wherein R is nitrobenzyl.

* * * * *

UNITED STATES PATENT AND TRADEMARK OFFICE
CERTIFICATE OF CORRECTION

PATENT NO. : 3,919,209

DATED : November 11, 1975

INVENTOR(S) : Steven R. Lammert and Stjepan Kukolja

It is certified that error appears in the above-identified patent and that said Letters Patent are hereby corrected as shown below:

Column 3, line 56, "trichloroethyoxycarbonyl" should read --trichloroethoxycarbonyl--.

Column 5, line 44, "solfent" should read --solvent--.

Column 6, line 44, "phthalimidopenicillin- ate" should read --phthalimidopenicillinate--.

Column 7, line 4, "2α,3α-methylenecepham" should read --2β,3β-methyleneoepham--.

Column 7, line 13, "yl-enecepham" should read --ylenecepham--.

Column 8, line 55, "5° to 25" should read --5 to 25--.

Column 9, lines 50-51, "also be Schotten-Baumann wherein" should read --also be employed wherein--.

Column 12, line 61, after "237°-238°" delete "λ".

Column 13, line 64, "3β-2α,3α" should read --3β-methyl-2α,3α--.

Column 14, line 68, "theyl" should read --ethyl--.

Column 16, line 39, "thalydrazide" should read --thalhydrazide--.

Column 17, line 9, "8.90" should read --8.09--.

Column 17, line 12, "2 ,3β" should read --2β,3β--.

Column 17, line 59, "3β,3β" should read --2β,3β--.

Column 19, lines 2-3, before "$C_1$-$C_3$ alkoxy" insert --$C_1$-$C_3$ alkyl--.

Signed and Sealed this sixth Day of April 1976

[SEAL]

Attest:

RUTH C. MASON
Attesting Officer

C. MARSHALL DANN
Commissioner of Patents and Trademarks